(12) United States Patent
Oberoi et al.

(10) Patent No.: US 9,090,357 B2
(45) Date of Patent: Jul. 28, 2015

(54) METHOD OF ASSEMBLING PANELIZED AIRCRAFT FUSELAGES

(75) Inventors: Harinder S. Oberoi, Snohomish, WA (US); Blair P. Nelson, Seattle, WA (US); Alan S. Draper, Everett, WA (US); Charles Y. Hu, Newcastle, WA (US); Randall Matthewson, Stanwood, WA (US); Branko Sarh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 736 days.

(21) Appl. No.: 13/327,669

(22) Filed: Dec. 15, 2011

(65) Prior Publication Data
US 2013/0152397 A1 Jun. 20, 2013

(51) Int. Cl.
*B64F 5/00* (2006.01)

(52) U.S. Cl.
CPC ............. *B64F 5/0009* (2013.01); *B64F 5/0036* (2013.01); *Y10T 29/49622* (2015.01); *Y10T 29/534* (2015.01); *Y10T 29/53004* (2015.01); *Y10T 29/53417* (2015.01); *Y10T 29/53974* (2015.01)

(58) Field of Classification Search
CPC ................ B64F 5/0036; B64F 5/0009; B62D 65/02–65/04; B62D 65/14; B62D 65/16; Y10T 29/53417; Y10T 29/534; Y10T 29/53004; Y10T 29/49622; Y10T 29/53974
USPC .......... 29/897.2, 281.4, 559, 407.1, 701, 791, 29/795; 901/8, 30; 700/248; 244/119, 120
See application file for complete search history.

(56) References Cited

U.S. PATENT DOCUMENTS

| 6,098,260 | A | 8/2000 | Sarh | |
|---|---|---|---|---|
| 6,481,096 | B2 * | 11/2002 | Lehmker et al. | 29/721 |
| 6,772,508 | B2 * | 8/2004 | Bloch et al. | 29/709 |
| 7,735,779 | B2 | 6/2010 | Griess et al. | |
| 7,756,321 | B2 * | 7/2010 | Marsh et al. | 382/152 |
| 8,534,603 | B2 * | 9/2013 | Grosse-Plankermann et al. | 244/118.5 |
| 2006/0182558 | A1 | 8/2006 | Frauen et al. | |
| 2007/0226981 | A1 * | 10/2007 | Craig et al. | 29/243.53 |
| 2009/0112349 | A1 * | 4/2009 | Cobb et al. | 700/114 |
| 2009/0294588 | A1 * | 12/2009 | Griess et al. | 244/121 |
| 2010/0243803 | A1 * | 9/2010 | Westre et al. | 244/119 |

FOREIGN PATENT DOCUMENTS

| DE | 10 2009 018 991 A1 | 11/2010 |
|---|---|---|
| EP | 0 304 942 A2 | 1/1989 |
| EP | 2251270 A1 | 4/2006 |
| EP | 2 221 151 A2 | 8/2010 |

* cited by examiner

*Primary Examiner* — Sarang Afzali
(74) *Attorney, Agent, or Firm* — Hugh P. Gortler

(57) ABSTRACT

A method of assembling a panelized aircraft fuselage comprises loading a keel structure on a cradle; attaching stanchions to a floor grid; positioning the floor grid and stanchions over the keel structure and attaching the stanchions to the keel structure; obtaining a full fuselage contour including locating lower panels on the floor grid while using the cradle, the floor grid, and the keel structure to support the lower panels, and locating upper panels on the lower panels; and fastening the lower panels to the keel structure and the upper panels. The fuselage is assembled upright from the keel structure without changing orientation of the fuselage.

15 Claims, 17 Drawing Sheets

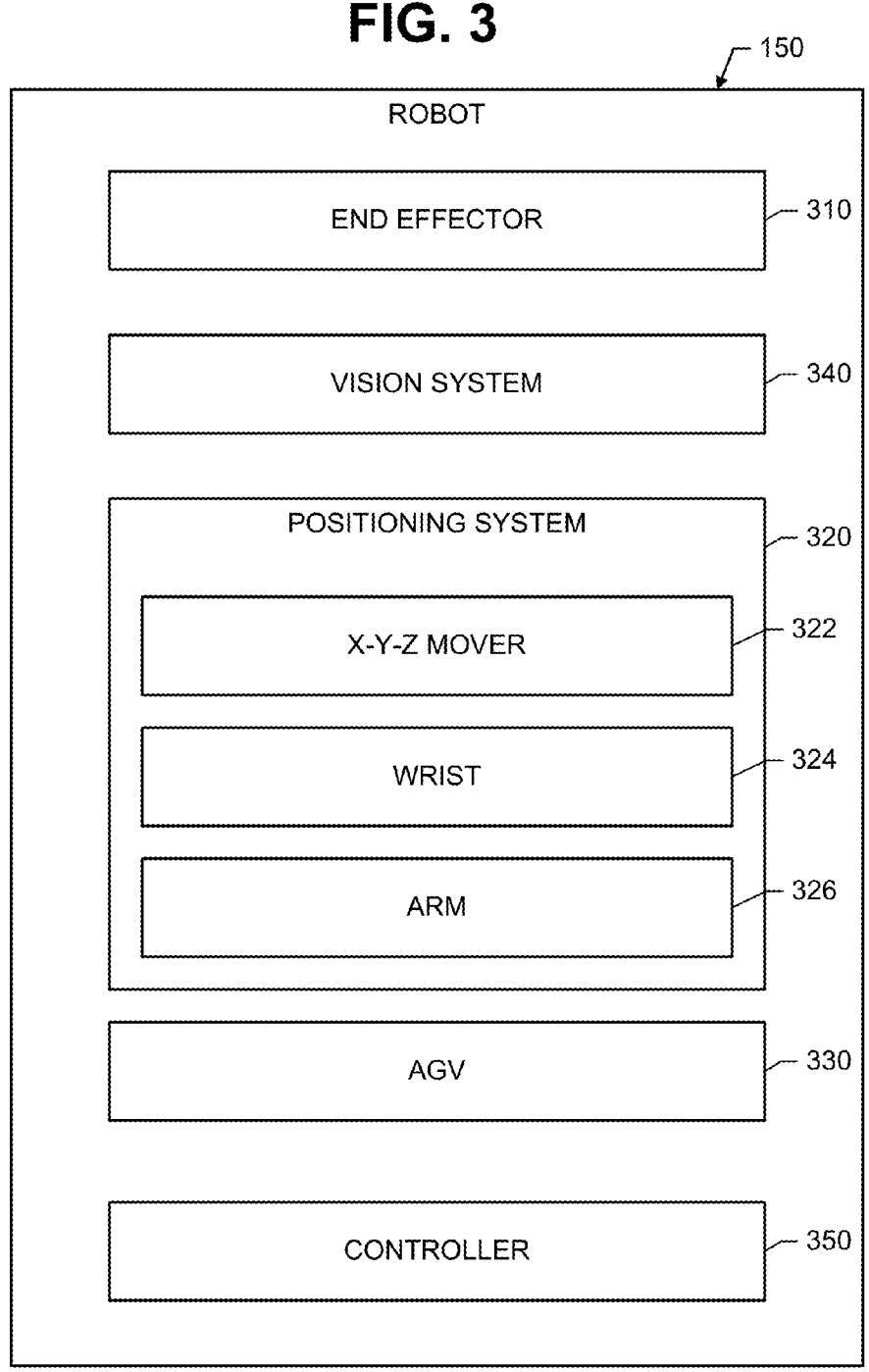

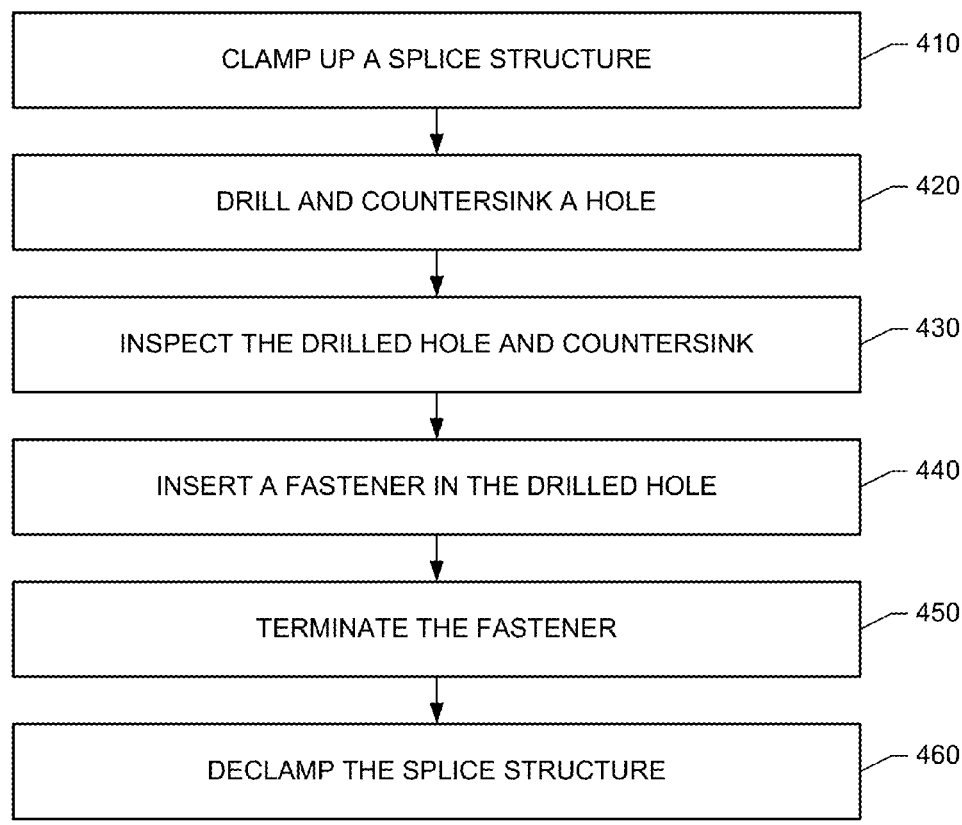

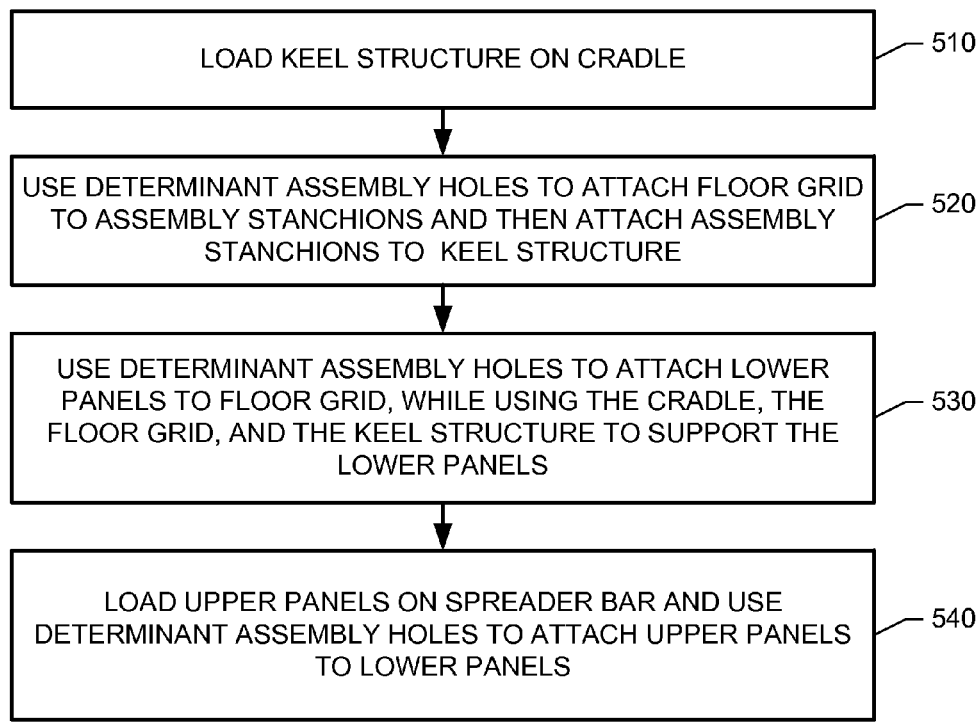
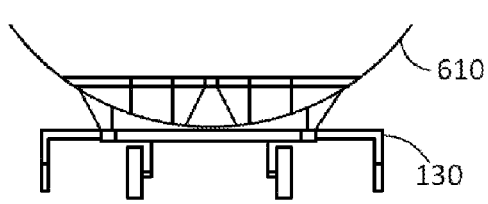
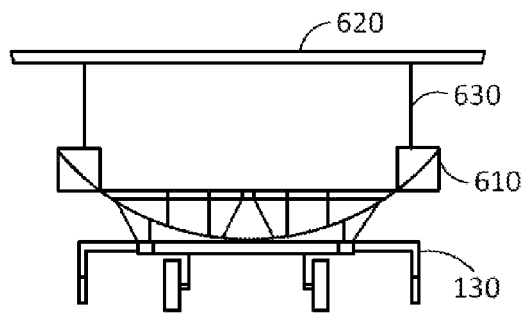

METHOD OF ASSEMBLING PANELIZED AIRCRAFT FUSELAGES

BACKGROUND

A commercial aircraft fuselage may have a panelized skin construction. For example, a panelized fuselage may include fuselage panels such as crown, side and keel panels attached to a frame. The crown panel is primarily subject to tension loading, the side panels are subject largely to shear and pressure load redistribution around windows and doors, and the keel is subject primarily to axial compression and load redistribution from a keel beam.

Facilities for assembling panelized fuselages of large commercial aircraft may include large floor spaces with jigs and fixtures secured to the floor. These jigs and fixtures are used to assemble the various panels into fuselages.

The assembly of panelized fuselages of large commercial aircraft is very labor intensive. Due to a heavy dependence on manual labor, production rates are subject to constant change. Changes in production rates can lengthen production times.

It would be desirable to create a more stable environment for assembling the fuselages of large commercial aircraft.

SUMMARY

According to an embodiment herein, a facility for assembling aircraft fuselages comprises a plurality of movable cradles. Each cradle is configured to support a fuselage keel structure and assemble a panelized fuselage in a single upright build position.

According to another embodiment herein, a method of assembling a plurality of aircraft fuselages comprises moving movable cradles to different locations on an assembly floor, and using the cradles to assemble panelized fuselages upwards without changing orientations of the fuselages.

According to another embodiment herein, a method of assembling a panelized aircraft fuselage comprises loading a keel structure on a cradle, attaching stanchions to a floor grid, positioning the floor grid and stanchions over the keel structure and attaching the stanchions to the keel structure, and locating lower panels on the floor grid. The cradle, the floor grid, and the keel structure are used to support the lower panels.

These features and functions may be achieved independently in various embodiments or may be combined in other embodiments. Further details of the embodiments can be seen with reference to the following description and drawings.

BRIEF DESCRIPTION OF THE DRAWINGS

FIG. 3 is an illustration of a robot for performing fuselage fastening operations.

FIG. 4 is an illustration of a one-up fastening operation.

FIG. 5 is an illustration of a method of performing an upright build of a fuselage.

FIGS. 6A-6E are illustrations of a fuselage during various phases of an upright build process.

DETAILED DESCRIPTION

Figure 1:
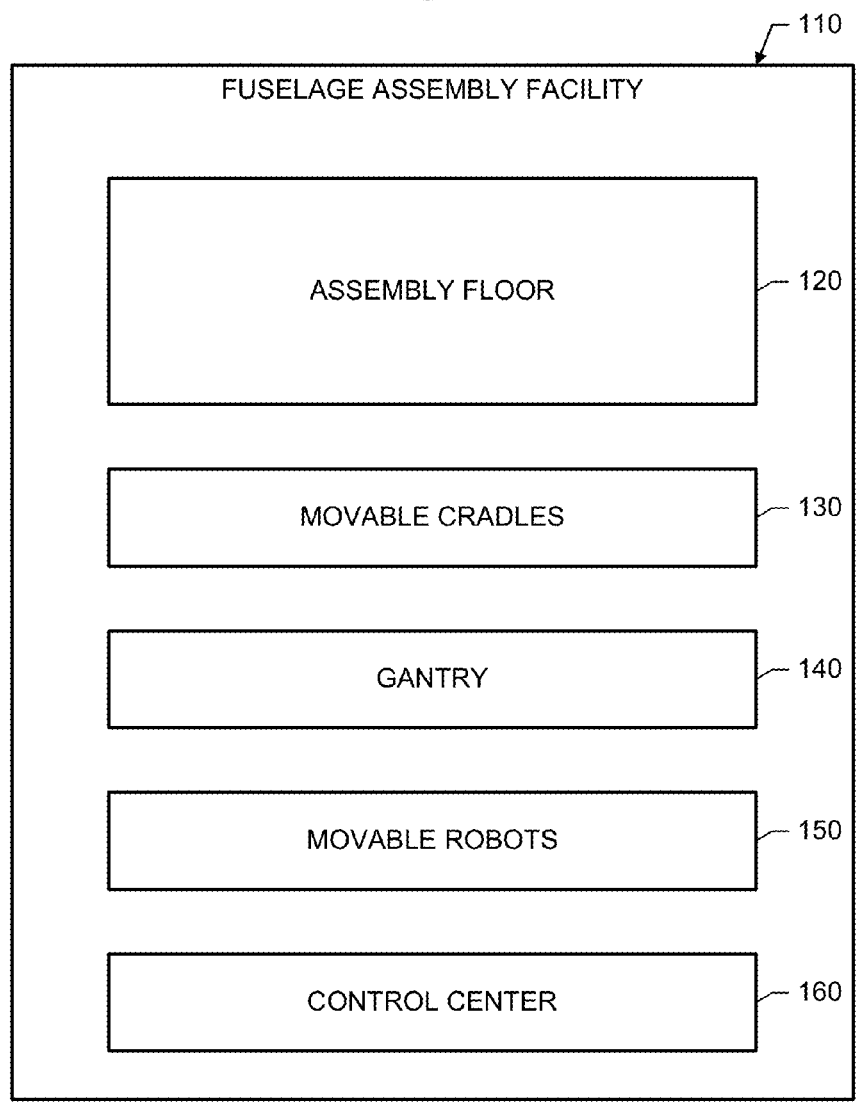
FIG. 1 is an illustration of a facility for assembling aircraft fuselages.

Reference is made to FIG. 1, which illustrates an automated facility 110 for assembling aircraft fuselages. The facility 110 includes an assembly floor 120. For example, the floor 120 may include one or more thick concrete slabs with appropriate load bearing capability. The slabs may be relatively flat and smooth. Unlike a conventional assembly facility, the facility 110 does not have fuselage assembly jigs and fixtures secured to the floor 120.

In some embodiments, the assembly floor 120 is large enough to accommodate multiple assembly areas or assembly cells. Within each assembly cell, a fuselage may be assembled. Multiple assembly cells allow multiple fuselages to be assembled at the same time.

The facility 110 further includes a plurality of movable cradles 130. Each cradle 130 is configured to support a fuselage keel structure and assemble a panelized fuselage in a single upright build position. A single upright build position of a panelized fuselage refers to a process that starts with a keel structure and adds panels upwards without changing orientation of the fuselage.

In some embodiments, each cradle 130 may be moved across the assembly floor 120 by an automated guided vehicle (AGV). In other embodiments, each cradle 130 may be moved across the floor 120 by a crane or fork truck.

The facility 110 further includes a gantry 140 for moving fuselage panels and other structures across the floor 120 to selected assembly cells. For instance, the gantry 140 may include cranes for picking up fuselage panels or floor grids at a first location, and placing the panels or floor grids onto cradles 130 of selected assembly cells.

The facility 120 also includes a plurality of robots 150 for performing fuselage fastening operations. Examples of fuselage fastening operations include, but are not limited to, drilling, fastener insertion, and fastener termination.

The robots 150 are movable into position alongside cradles 130 in selected cells. Consider an example in which first and second cradles 130 are in service for assembling first and second fuselages. Some robots 150 of the plurality are moved across the floor 120 into position alongside the first cradle, while other robots 150 of the plurality are moved across the floor 120 into position alongside the second cradle 130. Still other robots 150 may be at other locations on the assembly floor 120. Still other robots may be located in storage or in a maintenance depot.

In some embodiments, each robot 150 may be moved across the floor 120 by an automated guided vehicle (AGV). In other embodiments, each robot 150 may be moved across the floor 120 by a combination of AGV and manual assisted vehicles (e.g., a crane, a fork truck). Either AGV or manual assisted vehicles may be used to move the robots 150 across the floor 120 to a selected cell. (During operation, AGV is used to move the robots 150 along the length and circumference of a fuselage to complete drilling and fastening tasks in multiple zones.)

Some embodiments of the facility 110 may further include a control center 160 for controlling the placement, sequencing, and operation of the cradles 130, gantry 140, and robots 150. The control center 160 may include a computer system and it may be located above the assembly floor 120 with a high view for operations personnel and camera systems to visually observe the assembly operations. The cradles 130, gantry 140, robots 150 may communicate wirelessly with the control center 160. The control center 160 may also be responsible for controlling the robots 150 to avoid collisions and disruptions of automated manufacturing operations; determining when one robot 150 needs to be replaced with another robot 150 from the storage or maintenance depot; and making repair/replacement decisions on any non-conformances occurring during drilling/fastening operations on the fuselages.

In other embodiments, the cradles 130, gantry 140 and robots 150 may be programmed with artificial intelligence, which enables these systems to perform certain operations autonomously. The autonomous operation reduces the burden of central control, and distributes some of the burden to the cradles 130, gantry 140 and robots 150.

Figure 2A:
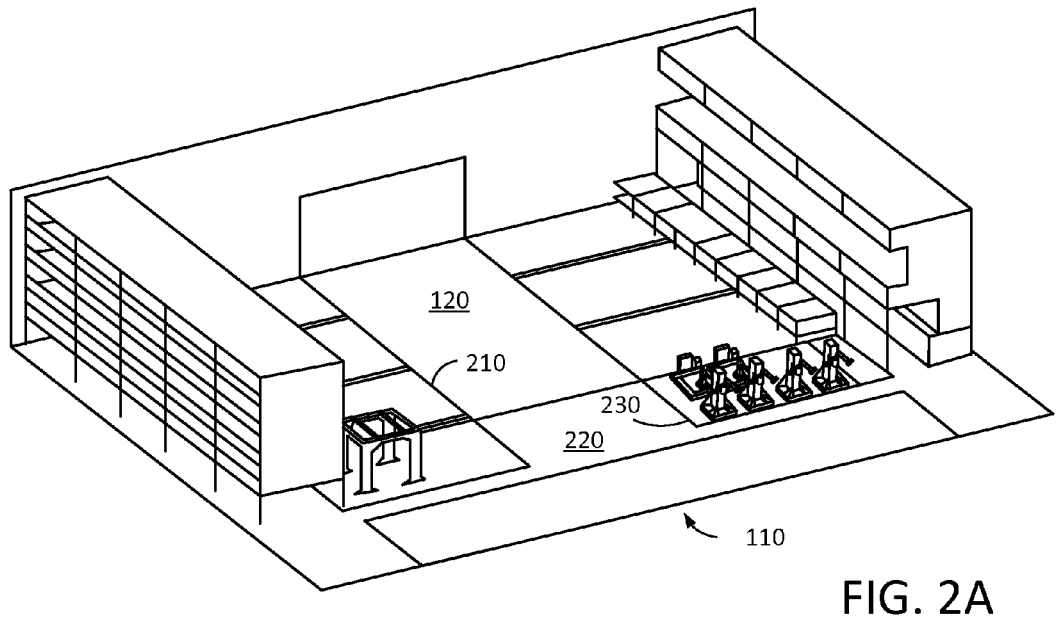
FIGS. 2A-2T are illustrations of an example of assembling a plurality of fuselages.
Figure 2B:
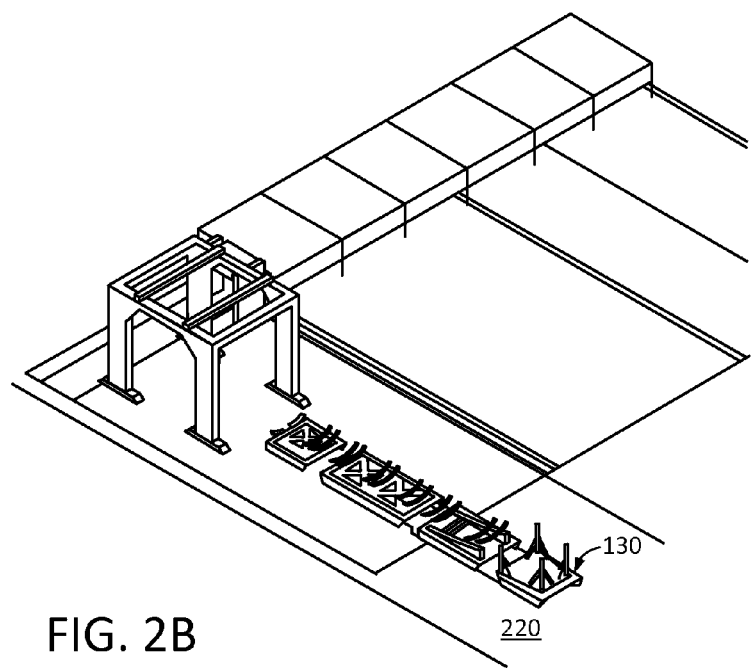
Figure 2C:
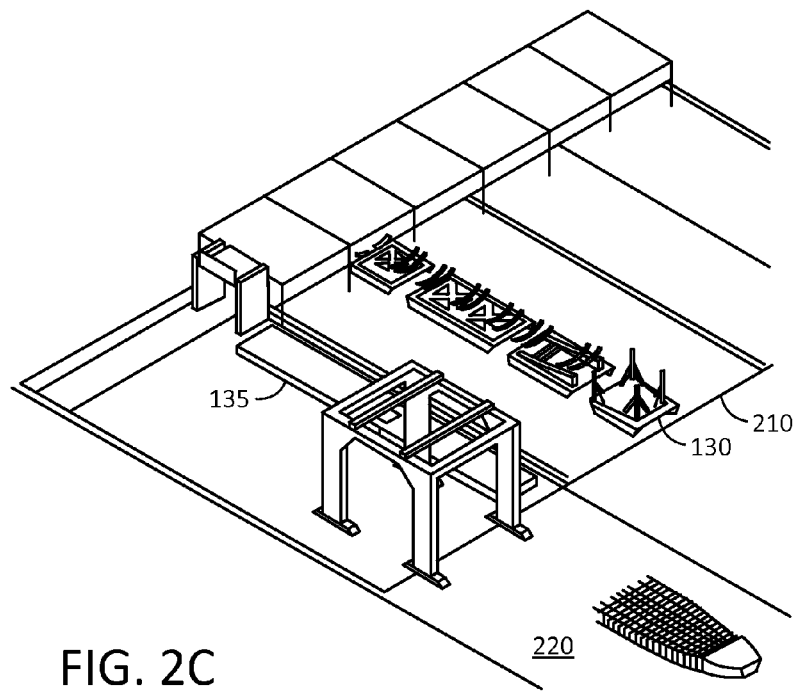
Figure 2D:
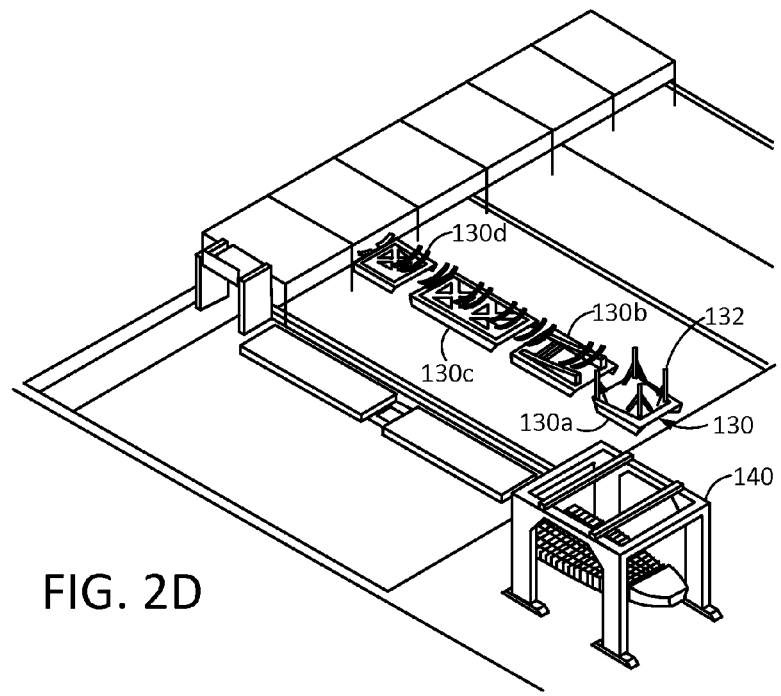
Figure 2E:
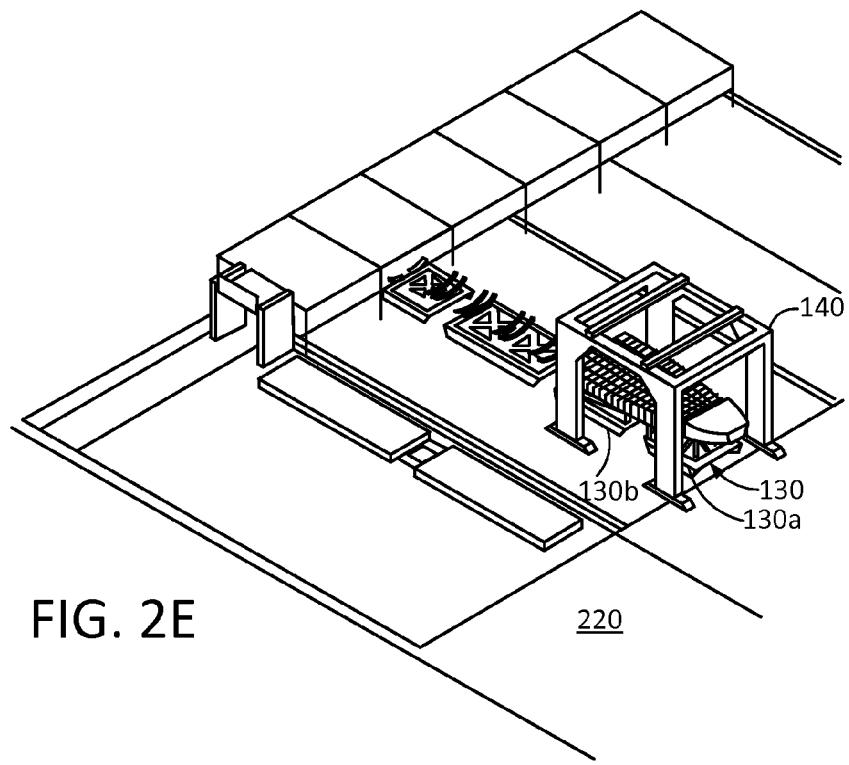
Figure 2F:
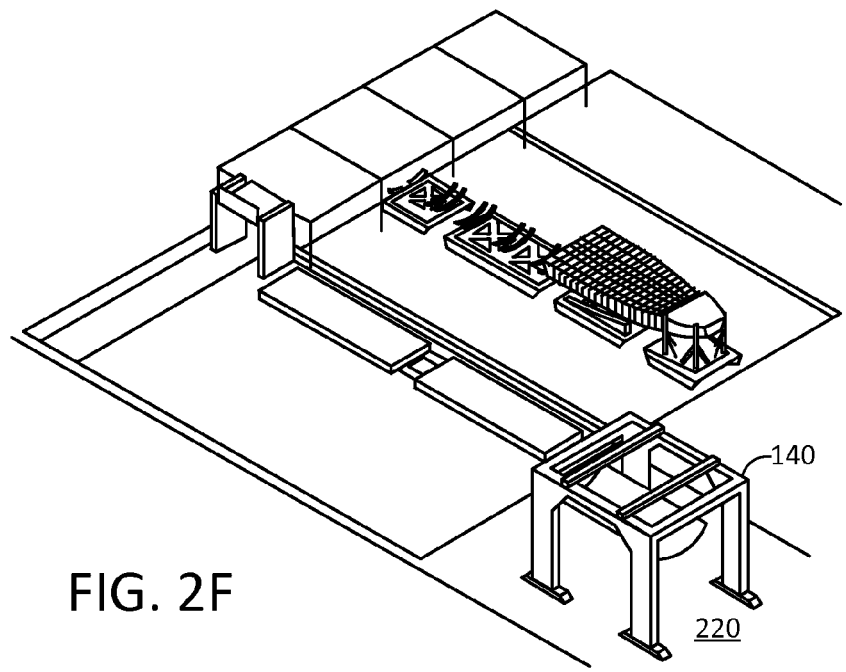
Figure 2G:
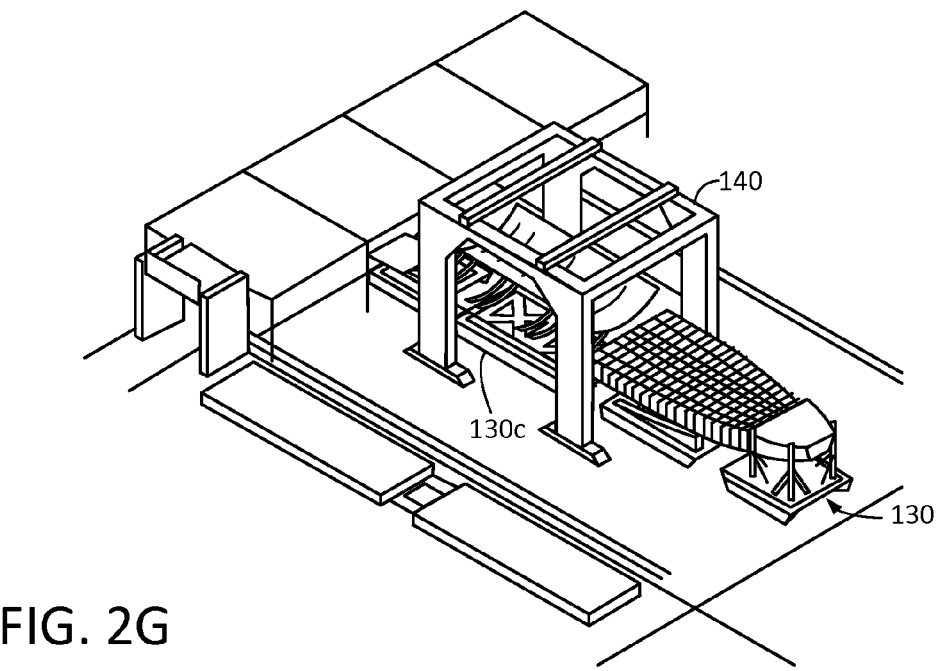
Figure 2H:
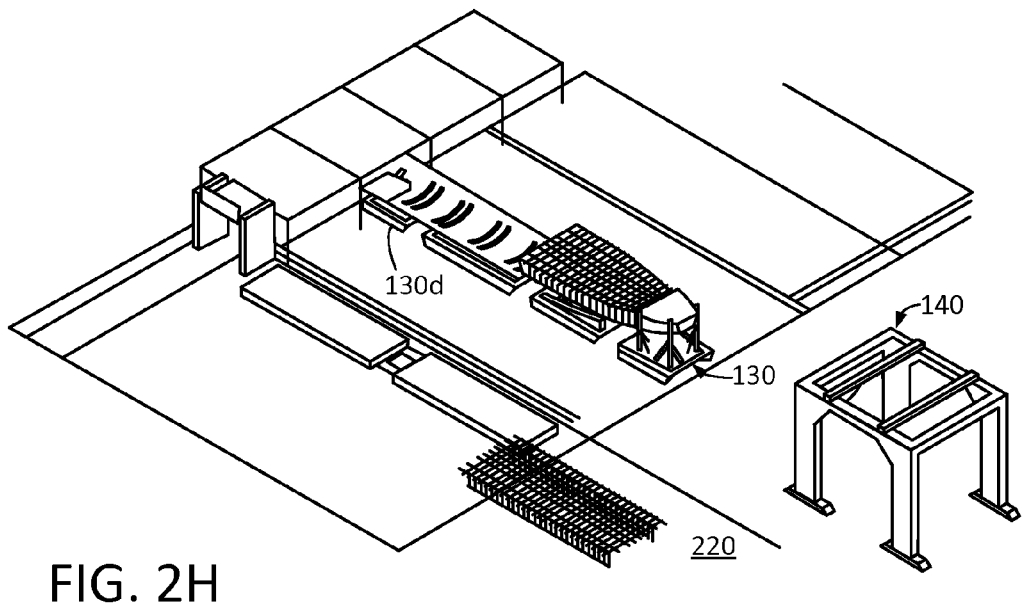
Figure 2I:
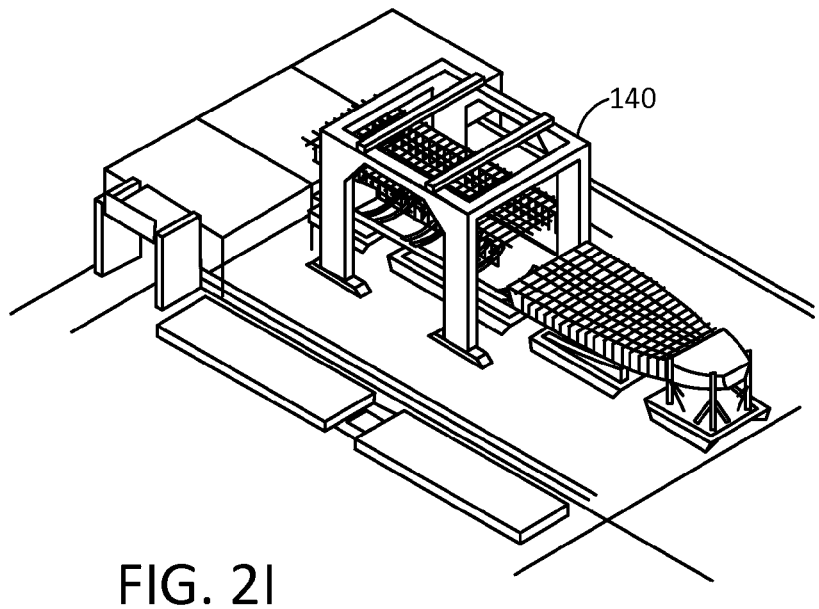
Figure 2J:
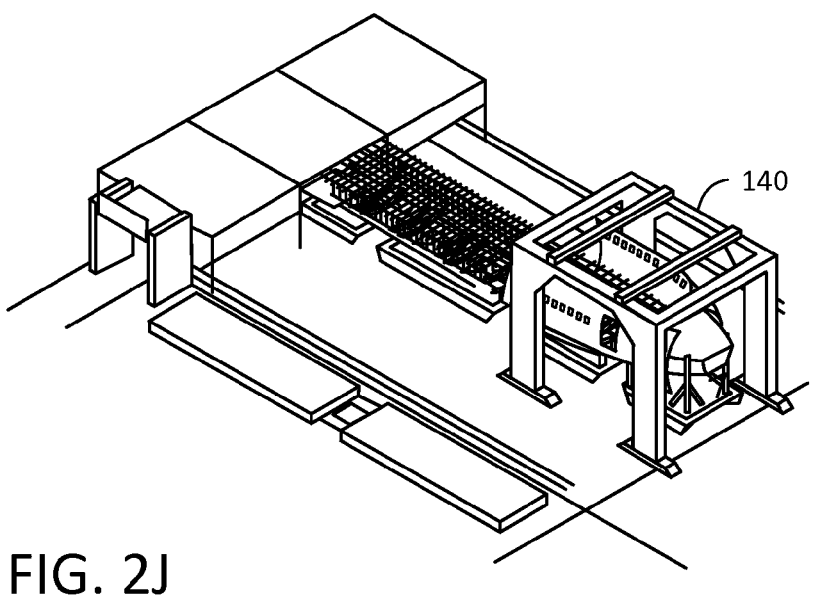
Figure 2K:
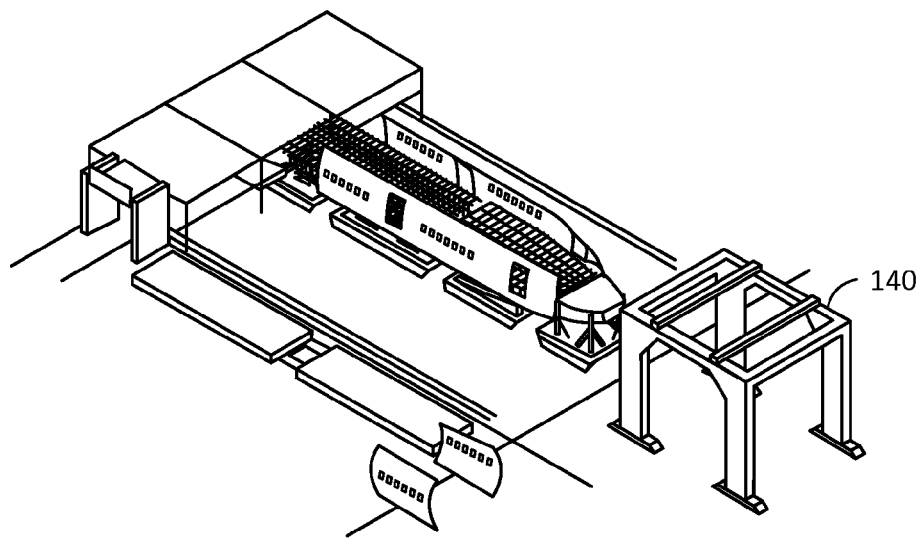
Figure 2L:
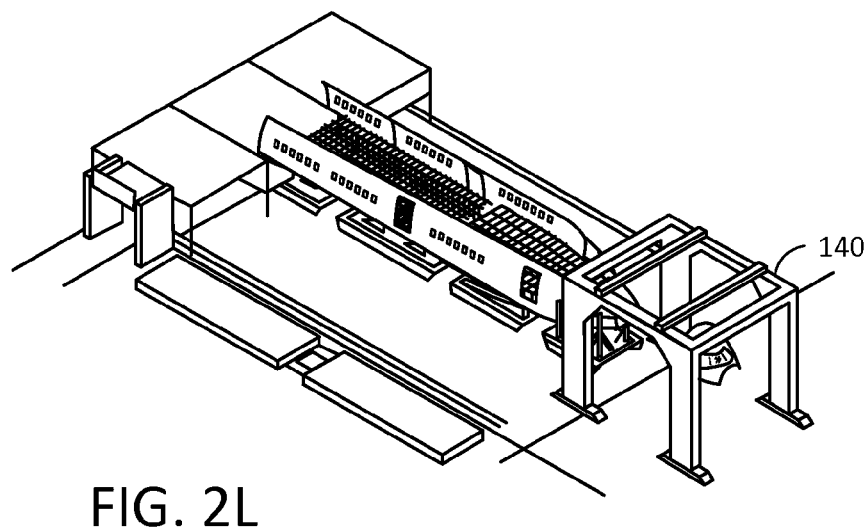
Figure 2M:
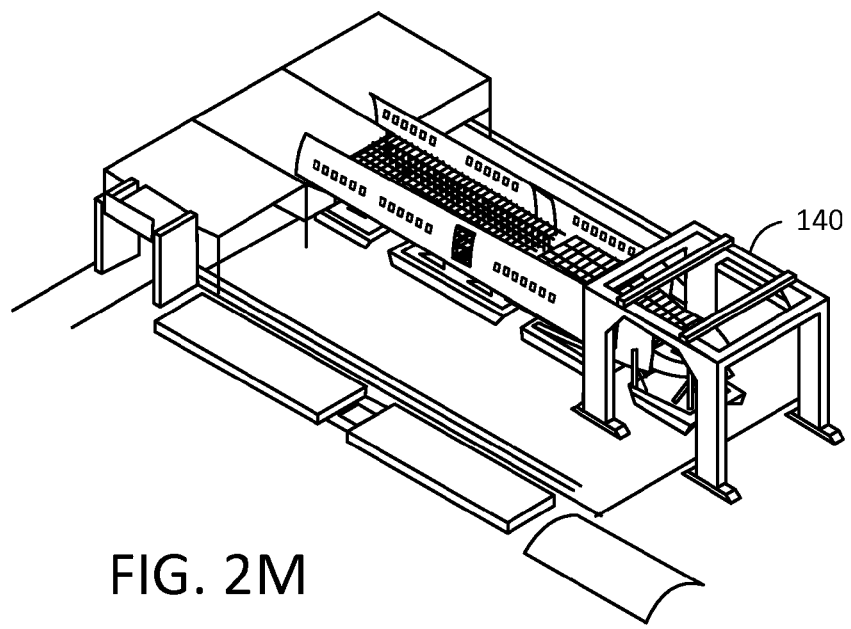
Figure 2N:
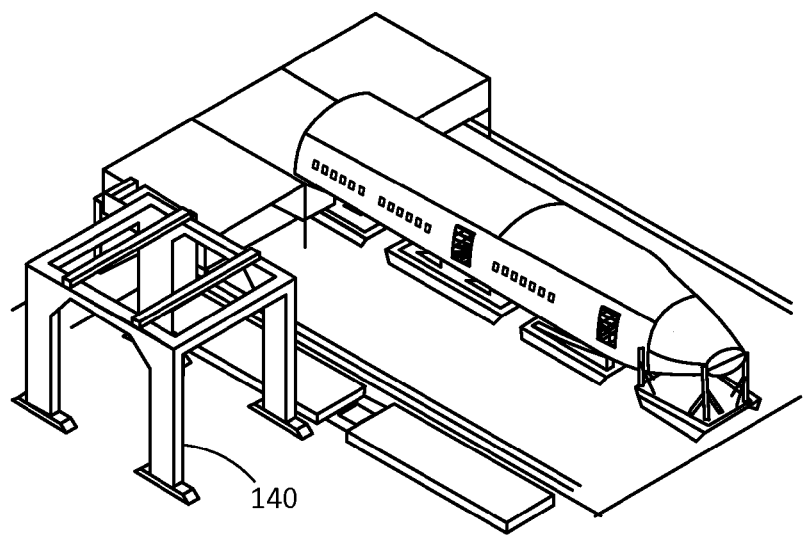
Figure 2O:
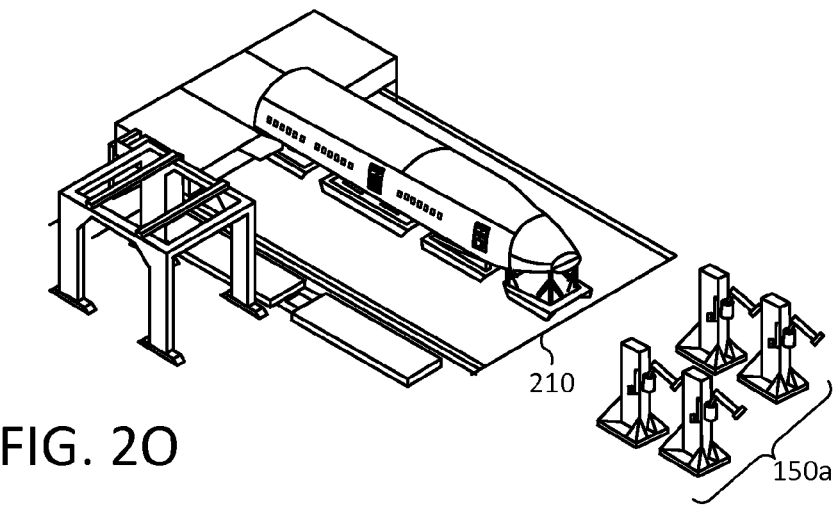
Figure 2P:
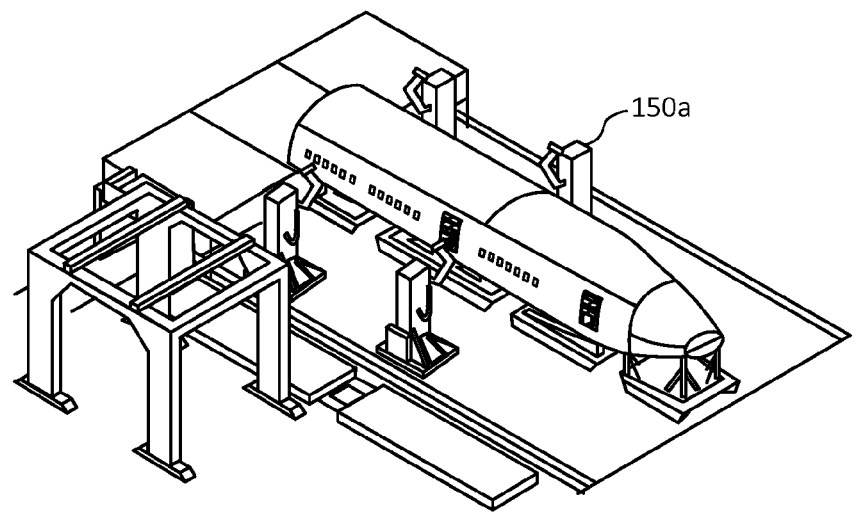
Figure 2Q:
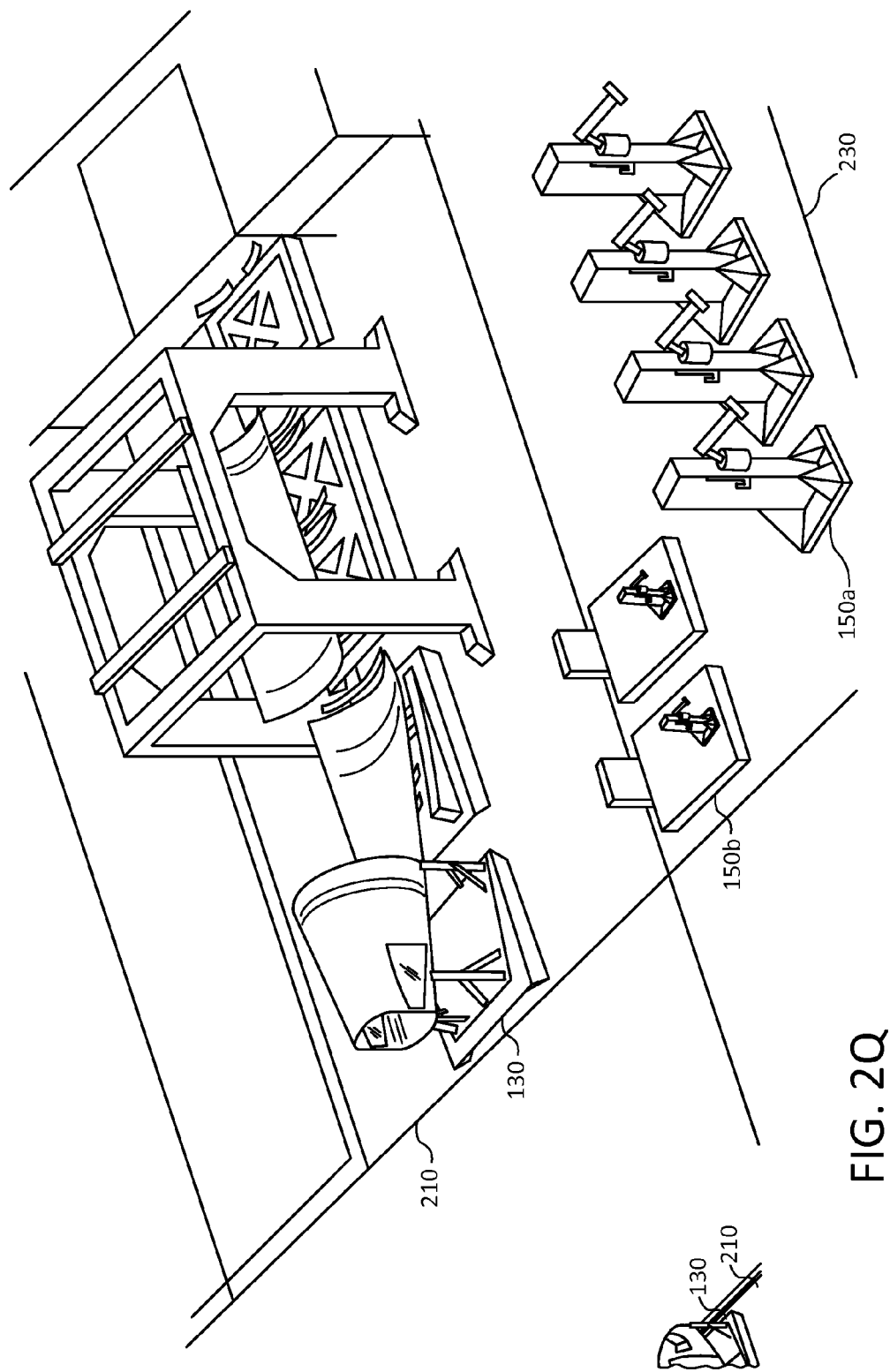
Figure 2R:
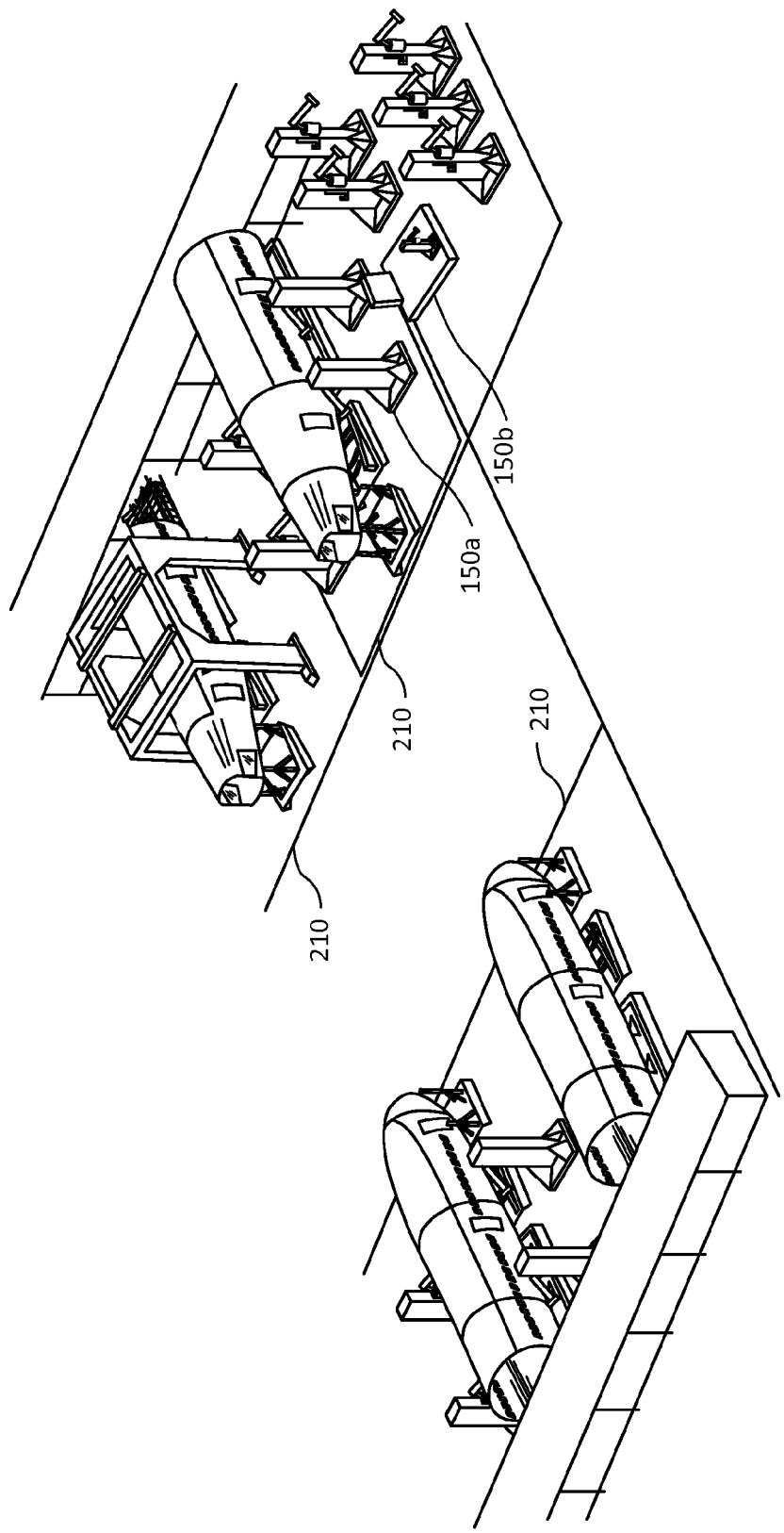
Figure 2S:
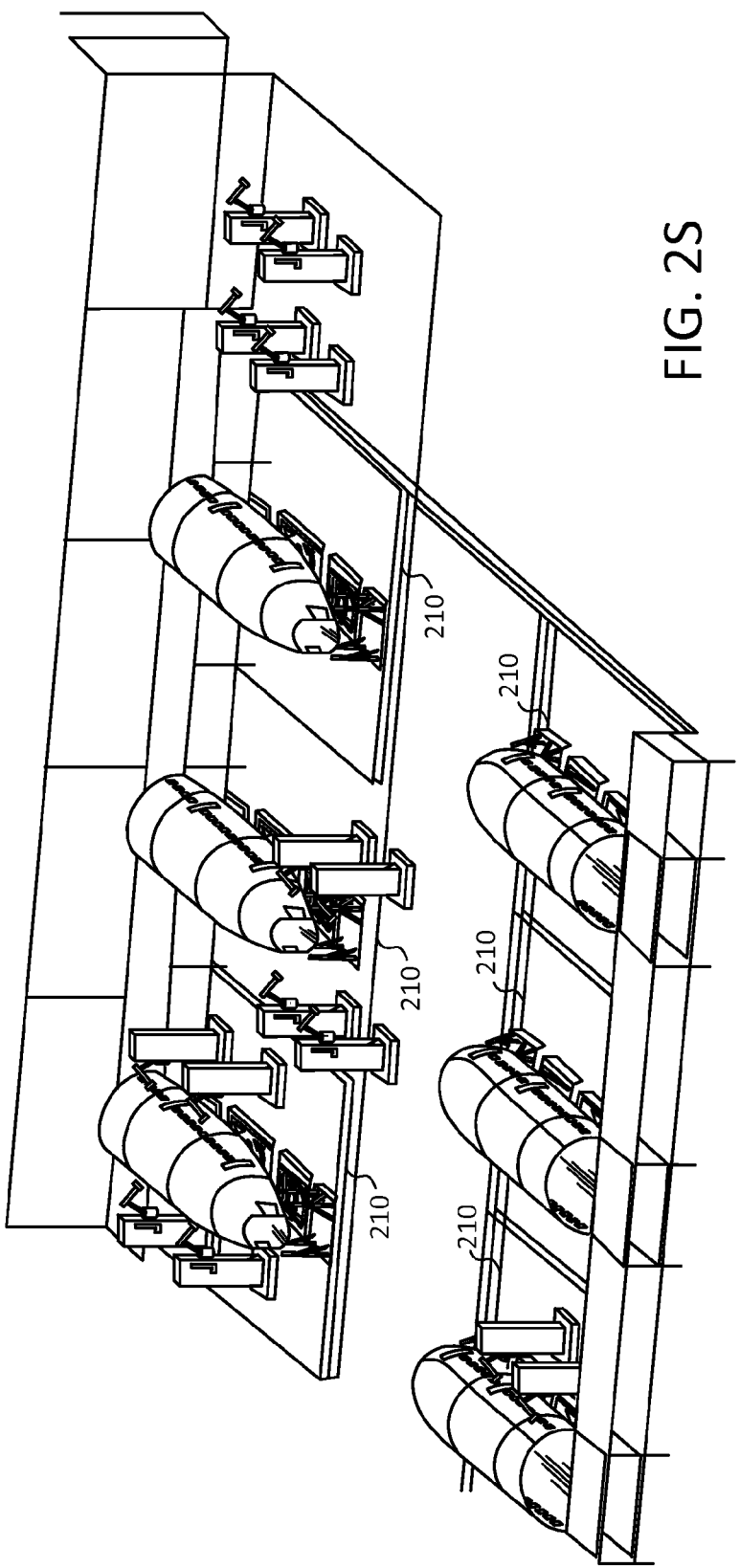
Figure 2T:
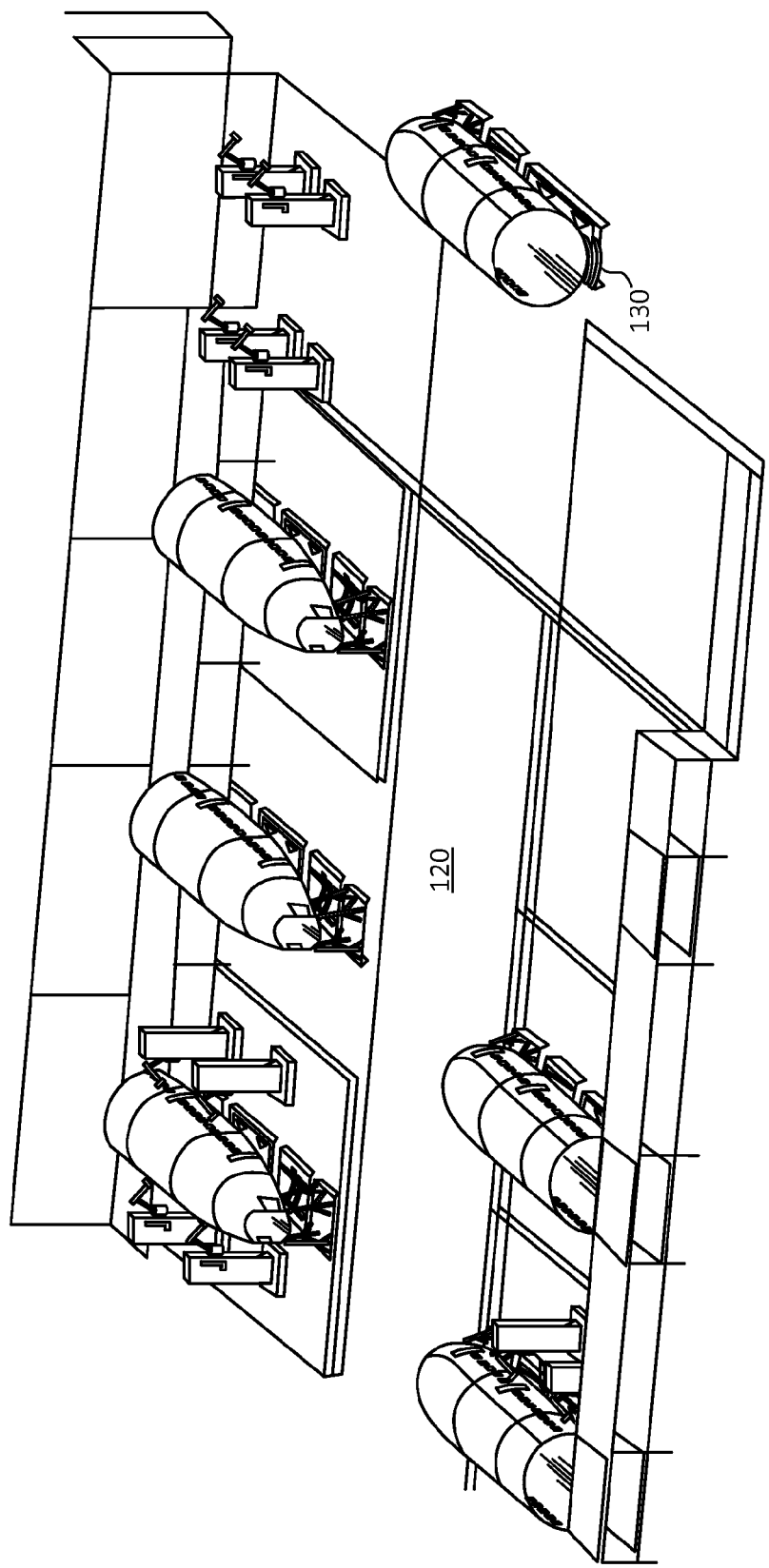

FIGS. 2A to 2T illustrate an example in which multiple fuselages are assembled by the automated facility 110. Control of the cradles 130, gantry 140 and robots 150 may be performed solely by the control center 160 or by a combination of central control and autonomous control.

FIG. 2A illustrates an example of a facility 110 having a single gantry 140 and an assembly floor 120 that has six assembly cells 210, a feeder line area 220, and a robot holding area 230. The cells 210 do not have any fuselage assembly jigs or fixtures secured to the floor 120. Each cell 210 only has markings for indicating cradle positions, robot paths, etc. The assembly floor 120 may be marked with paint, tape, RFID tags embedded in the floor 120, laser projections, etc. As will be explained below, the markings need not be precise.

The feeder line area 220 is the area where fuselage materials are received. It is also the area where built-up fuselages are delivered.

Idle robots 150 are located in the robot holding area 230. In this example, the robots 150 include two different types: tall robots 150a that perform longitudinal splices over the entire fuselage and circumferential splices on the upper portion of a fuselage (e.g., to the top of the crown at stringer 0); and short robots 150b that perform circumferential splices on the lower portion of a fuselage. Each robot 150a and 150b may be moved by an AGV. An AGV may find a cell 210 based on preprogrammed paths and assembly floor markings.

FIG. 2A does not show any cradles 130, nor does it show the control center 160. FIG. 2A shows the facility 110 prior to the assembly of any fuselages. The assembly floor 120 is vacant.

FIG. 2B shows the beginning of the assembly of a first fuselage. A first cradle 130 is moved (via an underlying AGV) into the feeder line area 220.

FIG. 2C shows the first cradle 130 after it has been moved into a first one of the six assembly cells 210. The cradle 130 may be positioned with respect to precise markings on the floor 120 of that first assembly cell 210. In this example, the first cradle 130 is moved into the lower leftmost cell 210. However, it could have been moved into any one of the other five cells 210. The selection of the assembly cell 210 is not random but rather based on rate and firing order (which determines the optional hardware that was ordered by the customer). This selection controls the path and timing of all the movements by the AGVs in order to avoid collisions.

As the first cradle 130 is being moved into the selected assembly cell 210, fuselage components may be moved to the feeder line area 220. FIG. 2C shows a fore keel structure located in the feeder line area 220. The fore keel structure and subsequent components may be transferred to the feeder line area 220 in large transportation/shipping fixtures, which may be moved by fork trucks. After the first cradle 130 is moved to the selected assembly cell 210, the AGV 135 that moved it is returned to the feeder line area 220.

FIG. 2D shows the gantry 140 positioned over the fore keel structure. The gantry 140 raises the fore keel structure and moves that structure over the cradle 130, and lays the fore keel structure onto the cradle 130, as shown in FIG. 2E. The gantry 140 is automated up to the delivery of the structure to the assembly cell 210. Once the keel structure is located over the cradle 130, the gantry 130 may be controlled manually to lower the keel structure onto the cradle 130. The gantry 140 may have a vision system for locating the initial position of the structure on the cradle 130. The gantry vision system may also be used for collision avoidance.

Precise positioning of the keel structure over the cradle 130 is not required. The keel structure need only be positioned over, and lowered into, arms 132 of the cradle 130. The arms 132 are contoured to guide the keel structure to an initial position.

The cradle 130 may be divided into multiple segments 130a-130d. In this example, the fore keel structure is placed onto two segments 130a and 130b, which move in tandem together to prevent any preloads on the keel structure. The cradle 130 may have an x, y, and z axis positioning system (not shown) to refine the position of the keel structure relative to the arms 132 (consequently, the position of the cradle 130 relative to the floor markings need not be precise).

In the meantime, a mid keel structure is being moved into the feeder line area 220. After the gantry 140 lowers the fore keel structure onto the cradle 130, it is returned to the feeder line area 220.

The gantry 140 is moved over the mid keel structure as shown in FIG. 2F, and then the gantry 140 moves the mid keel structure over the cradle 130. The gantry 140 then lays the mid keel structure onto segment 130c of the cradle 130, as shown in FIG. 2G. The x, y, and z axis positioning system refines the position of the mid keel structure.

An aft keel structure is supplied and positioned on segment 130d of the cradle 130. As the aft keel structure is being positioned, a floor grid is moved into the feeder line area 220 (FIG. 2H). The gantry 140 moves the floor grid and positions it onto the mid and aft keel structures, as shown in FIG. 2I.

The gantry 140 then moves fore, mid and aft side panels onto the keel structures, as shown in FIGS. 2J, 2K and 2L. The side panels are secured (e.g., pinned) to the keel structures.

The gantry 140 then moves nose, fore, mid and aft crown panels onto the side panels, as shown in FIGS. 2M and 2N. The crown panels are secured to the side panels.

The indexing of the side and crown panels may be performed by using determinant assembly holes, which are accurately drilled into structural components such as frames, stanchions, and floor beams. The use of the determinant assembly holes is described in greater detail below in connection with FIG. 4.

The panels and keel structures are then fastened together. A set of four tall robots 150a are commanded to move from the robot holding area 230 to the first cell 210, as shown in FIG. 2O. The tall robots 150a are brought in to perform high-reach operations. The tall robots 150a then position themselves about the fuselage, as shown in FIG. 2P. The robots 150a may identify determinant holes in the fuselage or they may identify other features. The robots 150a use these features to establish individual frames of reference with respect to the fuselage. Subsequent movements and robotic operations are performed with respect to those reference frames.

Once positioned, the tall robots 150a perform longitudinal splices and upper circumferential splices (the short robots 150b will perform the remainder of the circumferential splices). During splicing, skin panels are fastened to skin panels. For longitudinal splices, a lap join may be used to fasten skin panel to skin panel. Internal structures such as stringers and shear ties may be added to the joins. For circumferential splices, a butt join may be used to fasten skin panel to skin panel. Internal structures such as splice plates, shear ties, stringers and stringer splices may also fastened together with the butt joins.

After the tall robots 150a have performed the long-reach operations, the short robots 150b are brought in from the robot holding area 230 (FIG. 2Q) to perform low-access operations. The short robots 150b establish individual frames of reference with respect to the fuselage, and perform subsequent movements and lower circumferential splices with respect to those reference frames While the fastening operations are being performed, other fuselages may be assembled. As shown in FIG. 2Q, a second cradle 130 is moved to a second assembly cell 210, and keel structures of a second fuselage are loaded onto the second cradle 130.

As shown in FIG. 2R, assembly is being performed on two additional fuselages. After the tall robots 150a have finished its operations on the fuselage in the first cell 210, those robots 150a may be moved to the second assembly cell 210 to perform operations on the second fuselage. Additional tall robots 150a may be moved to a third cell to perform operations on a third fuselage. After the short robots 150b have performed their operations on the fuselage in the first cell 210, they may be moved to the second cell 210 or back to the robot holding area 230.

As shown in FIG. 2S, additional fuselages are assembled until all six cells 210 are occupied. As shown in FIG. 2T, when assembly of a fuselage has been completed, that completed fuselage is moved off the floor 120 by the cradle 130. The completed fuselage may be moved to a location for cleaning, sealing and painting.

Thus disclosed is an automated assembly facility using movable cradles, gantry and multiple robotic systems working in tandem for complete concurrent integration of multiple fuselages. Because the fuselage assembly is largely automated, dependence on manual labor is greatly reduced. Consequently, the production environment is more stable.

The floor space of the assembly facility is reconfigurable. Since no fixtures or jigs are secured to the assembly floor, assembly cells can be relocated, and spacing between cells can be changed. The reconfigurable floor space also helps with multiple product lines. If the supply chain of one model becomes constrained, the floor space may be reconfigured to produce other models until the supply chain recovers.

The assembly facility is scalable. To increase production rate, or to convert to a new product line, floor space is either expanded or reconfigured. Existing robots maybe used to service the new cells.

Different types of fuselages may be built in different cells at the same time. As the robots move from one cell to another, their programming and/or end effectors may be changed.

Reference is now made to FIG. 3, which illustrates an example of a robot 150. The robot 150 includes an end effector 310 that is configured to make fuselage splices. The end effector 310 may be further configured to perform operations including, but not limited to, inspection, sealant application, and electromagnetic clamping.

The robot 150 may have a positioning system 320 for translating and orienting the end effector 310. For example, the combination of an x-y-z mover 322 and a spherical wrist 324 provides six degrees of freedom for positioning the end effector 310 with respect to a surface of a fuselage. A robotic arm 326 may enable the end effector 310 to reach the belly and crown of the fuselage.

The robot 150 may include an AGV 330, which provides additional degrees of freedom. The AGV 330 moves the robot 150 across the assembly floor. The AGV 330 also positions the robot 150 along the fuselage during operation.

The robot 150 may include a vision system 340 that assists with the positioning. For example, the robot 150 is programmed to move to a rough position on in an assembly cell. The vision system 340 then detects key features (e.g., edge of skin panels, holes drilled on the longitudinal and circumferential splices) that provide a frame of reference.

Once the reference frame has been established, the robot uses that reference frame to move to a "work envelope." For instance, the AGV 330 may move the robot 150 a precise offset distance with respect to the reference frame. The robot may perform drilling and fastening operations at all locations within the work envelope.

A controller 350 may execute an NC program that commands the robot 150 to perform its operations. In some embodiments, the operations may include a one-up fastening process, which may be performed for each location along a splice.

Reference is now made to FIG. 4, which illustrates a one-up fastening process. At block 410, a splice structure is clamped up using, for instance, an electromagnet mounted on the robot's end effector 150 and a steel plate on the opposite side of (inside) the fuselage. The steel plate may be positioned manually or robotically using key features on fuselage frames. In a one-up process, the clamp not only holds two or more parts together but also prevents interlaminar burr from getting caught in between the clamped parts. It also prevents leakage of seal from the clamped parts. Because no chips or burrs are caught between the clamped parts, the one-up process improves fatigue strength of the joins.

At block 420, a hole is drilled and countersunk. At block 430, the drilled hole and countersink are inspected. At block 440, a fastener is inserted in the drilled hole. If the join is bolted, a sealant may also be applied. These steps may be performed robotically.

At block 450, the fastener is terminated. For instance, if the fastener is a bolt, a collar and nut may be placed onto the threaded end of the bolt and tightened. If the fastener is a rivet, a bucking bar may be used to upset (or buck) the free end. The fastener termination may be performed robotically or manually.

At block 460, the splice structure is declamped. Thereafter, the end effector 310 is positioned at a new location along the splice. The functions at blocks 410 to 460 are repeated.

Once all splices have been made in the robot's work envelope, the AGV 330 moves the robot 150 along the fuselage to a new work envelope. Additional splices are performed in the new work envelope.

FIG. 5 illustrates a method of assembling a panelized fuselage in a single upright build position. In some embodiments, the panels include skin and underlying stiffening structure. The panels may also include integrated frames (e.g., hoop frames).

Reference is made to FIG. 6A and block 510 of FIG. 5. A keel structure 610 is loaded onto a cradle 130. In some embodiments, the keel structure 610 may include keel panels and an integrated keel beam. The keel structure 610 may be loaded as a unitary structure or it may be loaded in sections (FIGS. 2C to 2H show a keel structure that is loaded in sections). The keel structure 610 is then aligned and leveled.

Reference is made to FIG. 6B and block 520 of FIG. 5. Assembly stanchions 630 are attached to a floor grid 620, and the stanchions 630 are lowered on panels of the keel structure 610. The floor grid 620 includes floor beams, vertical stanchions and other components (e.g., seat tracks, floor fittings, and intercostals). The assembled structure is positioned over, and lowered onto the keel structure 610, and the assembly stanchions 630 are fastened to the keel structure 610.

Figure 6C:
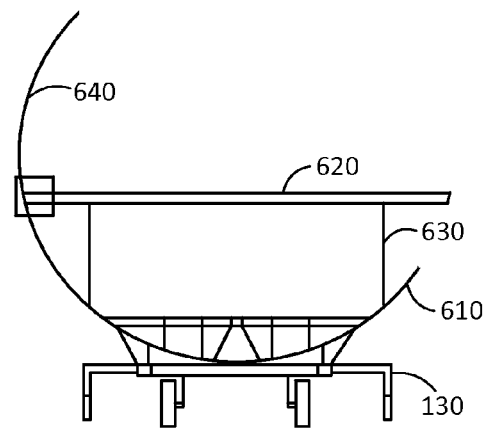
Figure 6D:
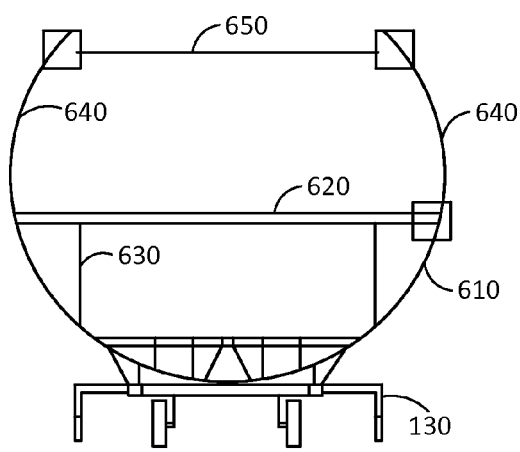

Reference is made to FIGS. 6C and 6D and block 530 of FIG. 5. Lower (e.g., side) panels 640 are loaded onto, and assembled to, floor beams of the floor grid 620. The stanchions 630, the keel structure 610 and the cradle 130 are used to support the lower panels 640. In some embodiments, the lower panels 640 may loaded as a unitary structure. (In the example shown in FIGS. 2J, 2K and 2L, the lower panels are loaded in sections.) In the example illustrated in FIGS. 6C and 6D, a left lower panel 640 is loaded and attached (FIG. 6C) and then a right lower panel 640 is loaded and attached (FIG. 6D). A spreader bar 650 may be used to support the free ends of the lower panels 640.

Figure 6E:
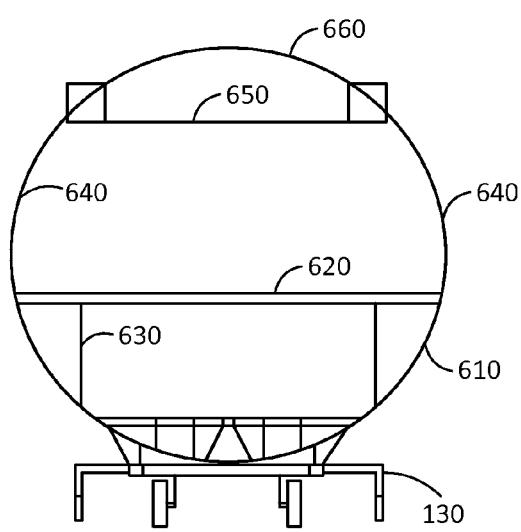

Additional reference is made to FIG. 6E and block 540 of FIG. 5. Upper (e.g., crown) panels 660 are loaded. The upper panels 660 may be loaded as a unitary structure, or they may be loaded in sections (as shown in FIGS. 2M and 2N). In FIG. 6E, the upper panels 660 are loaded onto the spreader bar 650 and assembled to the lower panels 640.

Determinant assembly (DA) holes may be used to locate the various panels. A first set of DA holes may be used to locate the floor grid 620 on the assembly stanchions 630; a second set of DA holes may be used to locate the assembly stanchions 630 on the keel structure 610; a third set of DA holes may be used to locate the lower panels 640 on the floor grid 620; and a fourth set of DA holes may be used to locate the upper panels 660 with respect to the lower panels 640. Once the DA holes have been aligned, mechanics may manually pin the determinant assembly holes.

By following the method of FIG. 5, a full contour of the fuselage section is obtained prior to splicing.

In some embodiments, all DA holes are internal on the fuselage structure (mostly on the inside stiffening structure such as frames, stanchions and floor beams), and no DA holes are located on the keel structure or any external structure of the fuselage skin panels. These DA locating holes may be precision machined on the internal structure.

In some embodiments, forward and aft bulkheads of the fuselage section may be used as initial indexing planes. The planes are used to maintain a perpendicularity relationship between the bulkheads and the keel structure. This ensures that all integration of panels results in a true cylindrical shape.

The invention claimed is:

1. A method of assembling a panelized aircraft fuselage, the method comprising:
   loading a keel structure on a cradle;
   attaching stanchions to a floor grid;
   positioning the floor grid and stanchions over the keel structure and attaching the stanchions to the keel structure;
   obtaining a full fuselage contour including locating lower panels on the floor grid while using the cradle, the floor grid, and the keel structure to support the lower panels, and locating upper panels on the lower panels; and
   fastening the lower panels to the keel structure and the upper panels,
   wherein the fuselage is assembled upright from the keel structure without changing orientation of the fuselage.

2. The method of claim 1, further comprising moving the cradle into a selected one of a plurality of cells on an assembly floor prior to loading the keel structure on the cradle.

3. The method of claim 2, further comprising using a moveable gantry to move the keel and lower and upper panels across the assembly floor to the selected cell.

4. The method of claim 2, further comprising plurality of robots for performing fuselage fastening operations into the selected cell, and using the robots to fasten the lower and upper panels.

5. The method of claim 4, wherein the robots are programmed to use fuselage features to establish individual frames of reference, and perform subsequent movements and robotic operations with respect to those reference frames.

6. The method of claim 4, further comprising using automated guide vehicles to move the robots and the cradle.

7. The method of claim 4, wherein each robot includes an end effector for performing fuselage fastening operations, a positioning system for positioning the end effector, and a controller programmed to control the positioning system to move the end effector through a sequence of fastening locations and control the end effector to perform the fastening operations at those locations in the sequence.

8. The method of claim 4, wherein the robots include tall robots for performing longitudinal splices and circumferential splices on upper fuselage portions, and short robots for performing circumferential splices on lower fuselage portions.

9. The method of claim 1, wherein a first set and a second set of determinant assembly (DA) holes are used to locate the stanchions on the floor grid and the keel structure, respectively; wherein a third set of DA holes are used to locate the lower panels on the floor grid; and wherein a fourth set of DA holes are used to locate the upper panels with respect to the lower panels.

10. The method of claim 9, wherein as the respective sets of DA holes are aligned, the floor grid is pinned to the stanchions, the stanchions are pinned to the keel structure, the lower panels are pinned to the floor grid and stiffened by the floor grid, and the upper panels are pinned to the lower panels to obtain the full fuselage contour.

11. The method of claim 10, wherein the pinning of the floor grid to the stanchions, the stanchions to the keel structure, the lower panels to the floor grid, and the upper panels to the lower panels is performed manually.

12. The method of claim 9, wherein all the sets of the DA holes are internal on the fuselage.

13. The method of claim 1, wherein the upper and lower panels include skin and underlying stiffening substructure.

14. The method of claim 1, wherein the keel structure is loaded in segments.

15. The method of claim 1, wherein the lower panels are separated with a spreader bar; and the upper panels are located on the spreader bar.

* * * * *